United States Patent Office 3,205,195
Patented Sept. 7, 1965

3,205,195
IMIDAZOLIDINE THIONE STABILIZERS FOR SYNTHETIC RUBBERS
Wendell S. Cook, Canal Fulton, Ohio, assignor to The Firestone Tire & Rubber Company, Akron, Ohio, a corporation of Ohio
No Drawing. Filed Jan. 2, 1962, Ser. No. 163,906
13 Claims. (Cl. 260—45.8)

This invention relates to a new stabilizer for synthetic rubbers derived entirely from hydrocarbons containing 4 to 6 carbon atoms (for example, polyisoprene, polybutadiene, isoprenebutadiene), and for synthetic rubbers which are copolymers derived largely from such monomers and another monomer present in minor amount such as styrene, substituted styrene, acrylonitrile, and lower alkyl acrylates and methacrylates (for example, SBR, NBR and ABR, etc.).

The stabilizers of this invention are particularly valuable in the stabilization of the polymers themselves, and their effectiveness carries on into the conventional rubber working and fabricating operations and into the useful life of the vulcanized article.

In the history of rubber stabilization, the fact that certain stabilizers or classes of stabilizers are effective or not effective as stabilizers in rubbers produced by emulsion polymerization is not indicative of whether these same compounds or classes of compounds will or will not be effective as stabilizers for rubber polymers produced by solution polymerization, and vice versa. It has never been determined whether this is due to the microstructure of the emulsion or solution polymers, or the molecular weight distribution, or both of these, or to some other factor or combination of factors.

A surprising fact is that the stabilizers of this invention are effective in emulsion polymers and in stereo-regular polymers. They can be used commercially in synthetic IR, BR, butadiene-isoprene copolymer, SBR, NBR and ABR, etc. regardless of the method of polymerization by which they are produced.

The stabilizers of this invention are imidazolidine thiones of the following formula:

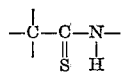

in which R'—C—R" is selected from the group in which (a) R' is an alkyl radical of 1 to 12 carbon atoms with R" hydrogen, (b) R'—C—R" is cyclohexyl and (c) R'—C—R" is alkyl-substituted cyclohexyl in which each alkyl substituent contains 1 to 12 carbon atoms, and

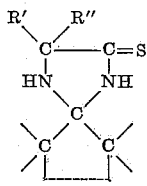

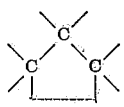

is selected from the group consisting of cyclohexyl and alkyl-substituted cyclohexyl in which each alkyl substituent contains 1 to 12 carbon atoms.

It is noted that in the foregoing formula the sulfur is attached to the carbon atom adjacent to a nitrogen and to another carbon atom, thus:

$$-\underset{|}{C}-\underset{\underset{S}{\|}}{C}-\underset{\underset{H}{|}}{N}-$$

As will be seen from what follows, the compounds of the above formula in which one of the carbons is substituted by both a hydrogen and an alkyl group is prepared from an aldehyde derivatives, the reaction necessarily resulting in an unsubstituted hydrogen. Similar reactions with ketone derivatives have not been successful because of interchange with the cyclohexanone (or alkyl-substituted cyclohexanone) used in producing the cyclohexane ring, whereas this interchange does not take place with the aldehyde derivative in this reaction.

An important property of these new stabilizers is the fact that they do not discolor, or discolor only slightly, during preparation or aging of the polymer or during vulcanization or subsequent aging. Thus they are very desirable stabilizers for use in white sidewall stocks used for the manufacture of rubber tires and in other white or light-colored rubber products such as tile, polystyrene blends, etc.

The imidazolidine thiones to which the invention relates includes, for example, compounds of the foregoing formula in which the cyclohexane ring is unsubstituted, R" is hydrogen and R' is methyl, ethyl, any propyl, butyl, pentyl, etc., up to and including dodecyl. It also includes compounds in which there are two cyclohexane groups and neither is substituted, as represented by the compound of the following formula:

7,14-diazadispiro-[5.1.5.2]-pentadecane-15-thione, or both are similarly substituted, the latter class including for example, compounds in which the one or more alkyl substituents have the same position in the respective rings with relation to the carbon of the heterocyclic ring. These compounds include, for example, the following derivatives having the following general tricyclic formula:

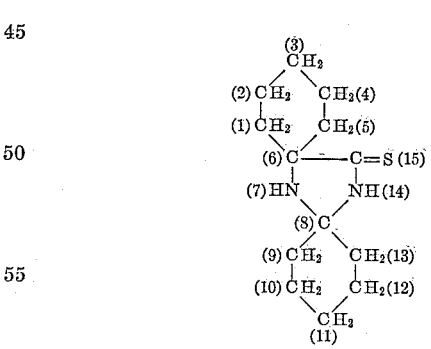

(the numerals being added to assist in numbering the carbon atoms), with substituents as indicated in the following:

3,11-dimethyl-7,14-diazadispiro - [5.1.5.2] - pentadecane-15-thione 3,11-di-t-butyl-7,14-diazadispiro - [5.1.5.2]-pentadecane-15-thione 3,11-di-t-amyl-7,14-diazadispiro - [5.1.5.2]-pentadecane-15-thione 3,11-di-n-butyl-7,14,diazadispiro - [5.1.5.2]-pentadecane-15-thione 2,10-dimethyl-7,14-diazadispiro - [5.1.5.2] - pentadecane-15-thione 2,10-di-n-butyl-7,14-diazadispiro - [5.1.5.2.]-pentadecane-15-thione 2,10-di-tt-octyl-7,14-diazadispiro - [5.1.5.2]-pentadecane-15-thione 3,11 - dicyclohexyl-7,14-diazadispiro - [5.1.5.2] - pentadecane-15-thione 3,11-diisopropyl-7,14-diazadispiro - [5.1.5.2] - pentadecane-15-thione 2,10-diethyl-7,14-diazadispiro - [5.1.5.2] - pentadecane-15-thione 2,4,10,12-tetramethyl-7,14-diazadispiro - [5.1.5.2]-pentadecane-15-thione 2,3,10,11-tetramethyl-7,14-diazadispiro - [5.1.5.2]-pentadecane-15-thione The literature describes several methods of preparing these imidazolidine thiones. The following example is representative:

EXAMPLE 1.—7,14-DIAZADISPIRO-[5.1.5.2]-PENTADECANE-15-THIONE

A mixture of cyclohexanone (522 g.) and hydrogen cyanide (71.9 g.) was fed into a stirred solution of ammonium sulfide (884 g. of a 22.6% aqueous solution) and methanol (10.8 ml.) over 1½ hours. A maximum temperature of 58° C. was reached toward the of the addition. The stirred reaction mixture was maintained at 60° C. for an additional hour by the application of heat, then allowed to cool. The white crystalline product was separated by filtration from the mother liquor.

The stabilizer is added to the polymer at any suitable stage in its preparation. It is preferably added to an emulsion polymer as a dispersion with a pH about the same as that of the latex, i.e. pH 10 to 10.5, after completion of the polymerization and before coagulation. From 0.1 to 10 parts of the stabilizer is used per 100 parts of polymer. In the treatment of solution polymers, the stabilizer is usually added to a solution of the polymer dissolved in a solvent compatible with the solvent used in the polymer solution. Smaller amounts of stabilizer can be used, as little as 0.1 to 0.2 percent being effective, although up to 5 percent can be employed.

In certain of the following results reference is made to the gel content. This was determined in the usual way by measuring the portion of the polymer insoluble in toluene. A gel content of over 5 percent after four days in an air circulating oven at 170° F. represents the maximum permissible for ordinary emulsion polymers, and 5 percent after one day at 100° C. for solution polymers.

In certain of the following tables the new stabilizers are compared with a blank, and in others with either of two commercial stabilizers identified as Stabilizer I and Stabilizer II, both of these stabilizers being widely used commercially and recognized as giving required polymer stability. The aging tests were all conducted in an oven through which air was circulated continuously.

*Treatment of emulsion polymers*

Table I distinguishes between the preparation of the dispersion of the stabilizer by referring to the dispersion prepared according to Example 2 as "emulsion," that prepared by ball milling the stabilizer in water with a dispersing agent as "ball milled," and by referring to stabilizer which has been dissolved in toluene and then dispersed in an aqueous soap solution as "solution," the toluene eventually being vaporized during the drying of the rubber polymer.

The stabilizer is used to stabilize any emulsion polymer of the type defined above. It is preferably added as an emulsion and the following formula is representative:

EXAMPLE 2

Preparation of dispersion recipe:

| | | |
|---|---|---|
| Imidazolidine thione of Example 1 | g__ | 7.5 |
| Fatty acid (polymerization grade) | g__ | 0.655 |
| Wetting agent [1] | g__ | 0.7 |
| NaOH | g__ | 2.5 |
| Water | ml__ | 100 |

[1] The wetting agent employed was a naphthalene sulfonate salt manufactured by Dewey & Almy Company and known as Daxad 11. Similar wetting agents may be employed.

The sodium hydroxide was dissolved in 50 ml. of water containing the wetting agent. The imidazolidine thione was added to the foregoing aqeous solution in a blender and stirred rapidly until a uniform dispersion was obtained. The fatty acid was then added slowly, dropwise, to the stirring suspension, forming a thick foam. The remaining water was added slowly to make a thinner pourable foam. The temperature of the dispersion must be kept sufficiently low to prepare and maintain a suitable foam.

The foregoing dispersion of the stabilizer was added to SBR latex which was being stirred rapidly at room temperature. After thoroughly mixing, the latex was creamed by the addition of NaCl solution. The creamed latex was then coagulated by the addition of $H_2SO_4$ bringing the pH of the solution to between 2.5 and 3.0. The coagulated crumb was washed several times and was then dried overnight.

Although the foregoing applies more particularly to the addition of stabilizer to SBR, it is equally applicable to the stabilization of other emulsion-polymerized diene rubbers including BR, NBR, IR and ABR, etc.

The stabilized polymer withstands the aging incident to commercial storage and use, and the following tables record the results of accelerated aging by the usual method in a hot air oven for the times and at the temperatures indicated.

For simplicity, the different stabilizers will be identified in the following by various code letters, as follows:

Stabilizer:
    A—7,14-diazadispiro-[5.1.5.2]-pentadecane-15-thione
    B—3,11-di-t-amyl-7,14-diazadispiro-[5.1.5.2]-pentadecane-15-thione
    C—3,11-dimethyl-7,14-diazadispiro-[5.1.5.2]-pentadecane-15-thione
    D—2,10-dimethyl-7,14-diazadispiro-[5.1.5.2]-pentadecane-15-thione
    E—3-octyl-1,4-diazadispiro-[4.5]-decane-2-thione The following table compares Stabilizer A added in different forms, with Stabilizers I and II. All of the test results except those in the column headed "Heat aging at 155° C." refer to results after aging the indicated number of days at 76° C. (170° F.) in an air-circulating oven. The "surface rating" results were taken after 9 days aging at 76° C. and show the surface condition of the various products. These tests were conducted on 100 grams SBR crumb containing 0.5 part of the various stabilizers added by indicated means prior to coagulation.

TABLE I

| Stabilizer | Dispersion | Heat aging at 170° F. (76° C.) | | | | | | | Heat aging at 155° C. | | |
|---|---|---|---|---|---|---|---|---|---|---|---|
| | | Mooney visc. | | Percent gel | | color rating* | | Surface rating, 9 days | Time in minutes to glassy melt | Color rating at time intervals | |
| | | Orig. | 9 days | Orig. | 4 days | Orig. | 9 days | | | 0' | 90' |
| A | Emulsion | 54.5 | 54 | 0.25 | 0.00 | 1 | 2 | Very slightly fused | 60 | 1 | 6 |
| A | Ball milled | 54 | 52.5 | 1.75 | 1.00 | 1 | 3 | Slightly fused | 60 | 1 | 6 |
| A | Solution | 50.5 | 54 | 0.175 | 1.50 | 1 | 3 | do | 60 | 1+ | 6 |
| I | Emulsion | 51.5 | 48.5 | 0.10 | 0.00 | 1 | 5 | Fused | 20 | 1 | 5 |
| II | do | 51.0 | 37.0 | 0.05 | 0.05 | 1 | 5 | do | 20 | 1+ | 6+ |
| I | Solution | 52.0 | 98 | 0.075 | 10.00 | 1 | 7 | Hardened | 20 | 1 | 5+ |
| II | do | 52.5 | 42.5 | 0.225 | 0.00 | 1 | 7 | Fused | 20 | 1+ | 5+ |

*Color ratings: (1) White; (2) Very slightly yellow; (3) Slightly yellow; (4) Light yellow; (5) Yellow; (6) Dark yellow; (7) Very dark yellow.

Table II shows the stabilizing effect of various of the stabilizers of this invention. Each of the samples contains 0.5 part of the stabilizer per 100 parts of the SBR. The various samples were aged 4 or 9 days at 76° C. and the condition of the SBR polymer before and after aging is recorded.

TABLE II.—HEAT AGING AT 170° F. (76° C.)

| Stabilizer | Color | | Mooney viscosity | | Percent gel | |
|---|---|---|---|---|---|---|
| | After aging 4 days | After aging 9 days | Before aging | After aging | Before aging | After aging |
| A | White | | 54.0 | 50.5 | 0.42 | 3.6 |
| D | do | | 52.0 | 52.5 | 0.42 | 0.98 |
| C | | Very slightly grey. | 54.3 | 57.0 | 0.52 | 1.55 |
| B | | Tr. yellow | 53.0 | 54.0 | 0.65 | 0 70 |
| E | | Very slightly yellow. | 52.0 | 54.0 | 0.55 | 0.45 |
| A | | Very light cream. | 53.5 | 54.0 | 0.67 | 0.55 |

The results show the relative stabilizing action of several of the stabilizers of this invention on emulsion polymers, all of which give good stabilization with substantially no change in color of the polymer after accelerated aging. Although the effect on the surface after aging for 4 or 9 days is not shown in the table, in all cases there was no resinification. The change in Mooney viscosity was not significant, and the amount of gelling was low in all instances. Each of the stabilizers was very effective.

EXAMPLE 3

The polymers of Example 2 and Table I were butadiene-styrene copolymers made by a hot emulsion-polymerization system using a fatty acid soap emulsifier. The butadiene-styrene copolymer of this example had the same content of bound styrene, about 23.5 percent, but was made by a cold-emulsion polymerization system using a fatty acid and rosin soap emulsifier.

A sample containing 0.6 part by weight of Stabilizer A per 100 parts of the copolymer was aged in an air oven at 70° C. for 10 days. Table III records the changes in Mooney viscosity, gel content and color rating both before and after such aging, and gives the time of heating in an air oven at 155° C. to cause the surface of the polymer to form a glaze and then to melt, and includes a record of the color change after heating at 155° C. for 45 minutes.

TABLE III

| | Original | After 10 days |
|---|---|---|
| Oven aged at 70° C.: | | |
| Mooney viscosity | 67.0 | 53.5. |
| Gel (percent) | 0.37 | 0.47. |
| Color rating | V. sl. yellow | Yellow. |
| Oven aged at 155° C.: | | |
| Time to glaze | 30 min | |
| Time to melt | 45 min | |
| Color rating: | | |
| Original | V. sl. yellow | |
| After 45 min | Dark yellow | |

The results show that this polymer stood up very well in these aging tests.

EXAMPLE 4

The example relates to stabilization of butadiene-styrene copolymer of about 23.5 percent bound styrene made by a cold polymerization system using a fatty acid and rosin soap emulsifier and extended with 37.5 parts of an aromatic oil based on the weight of the copolymer.

The test material contained 0.5 part of Stabilizer A per 100 parts of the polymer. The effect of aging in an air oven for 8 days at 76° C. is recorded in Table IV.

TABLE IV

| | Before aging | After aging |
|---|---|---|
| Mooney viscosity | 45.5 | 48.0. |
| Color | Light tan | Light tan. |
| Surface | OK | OK. |

There was only slight increase in the viscosity and no change in color (the darker color both before and after aging being due to the presence of the oil). There was no melting of the surface of the polymer during aging, showing that Stabilizer A is an excellent stabilizer in this polymer.

All of the stabilizers of this invention are effective in the emulsion-polymerized elastomers and the foregoing results are illustrative. The stabilizers are relatively less soluble in aqueous solutions and latexes of higher pH than in aqueous solutions and latexes of lower pH.

Table V compares the relative effectiveness of the stabilizers of this invention in SBR vulcanized tire tread stock before and after aging. 0.5 part per 100 of the stabilizers (coded as before) was contained in 100 parts of polymer and these were compounded with different rubber chemicals as indicated in the first few lines of the table, each of the rubber chemicals being added to each of the stocks.

TABLE V

|  | A | A | C | B | E |
|---|---|---|---|---|---|
| SBR+Stabilizer A | 100 | | | | |
| SBR+Stabilizer A | | 100 | | | |
| SBR+Stabilizer C | | | 100 | | |
| SBR+Stabilizer B | | | | 100 | |
| SBR+Stabilizer E | | | | | 100 |
| HAF Black | 50 | | | | |
| Zinc oxide | 3 | | | | |
| Stearic acid | 1.5 | | | | |
| Oil | 8.0 | | | | |
| Sulfur | 1.75 | | | | |
| Accelerator | 1.00 | | | | |
|  | 165.25 | 165.25 | 165.25 | 165.25 | 165.25 |
| Normal stress-strain cured at 300° F.: | | | | | |
| 300% modulus, p.s.i., 30' | 1,725 | 1,650 | 1,475 | 1,650 | 1,700 |
| Tensile, p.s.i., 30' | 3,175 | 3,100 | 3,125 | 3,300 | 3,025 |
| Elongation, percent, 30' | 490 | 480 | 530 | 530 | 500 |
| Aged 2 days at 212° F.: | | | | | |
| 300% modulus, p.s.i., 30' | 2,075 | 2,025 | 1,800 | 2,000 | 1,850 |
| Tensile, p.s.i., 30' | 3,100 | 3,075 | 3,275 | 3,150 | 2,625 |
| Elongation, percent, 30' | 250 | 250 | 290 | 250 | 240 |

The results show relatively uniform stabilization of the valcanizates by the different stabilizers.

The following table compares tread stocks of the same general formula as shown in Table V, but in Sample I, 1.25 parts per 100 of commercial Stabilizer I (coded as before) was utilized, and in Sample A, 0.5 part per 100 of Stabilizer A (coded as before) was utilized, both being added to the SBR emulsion polymer containing about 23.5 percent bound styrene by a hot polymerization system, prior to coagulation. After coagulation and drying, the same rubber chemicals as employed in Table V were added as indicated in the table and said stocks vulcanized or cured. The results show the new stabilizer used in the smaller amount is fully equivalent to the widely used commercial stabilizer used in larger amount. It is known that the commercial Stabilizer I is of 100 percent purity and is not diluted.

TABLE VI

|  | I | A |
|---|---|---|
| SBR + Stabilizer I | 100 | |
| SBR + Stabilizer A | | 100 |
| HAF Black | 50 | |
| Zinc oxide | 3 | |
| Stearic acid | 1.5 | |
| Oil | 8.0 | |
| Sulfur | 1.75 | |
| Accelerator | 1.00 | |
|  | 165.25 | 165.25 |
| Normal stress-strain-cured at 300° F.: | | |
| 300% modulus, p.s.i., 30' | 1,800 | 2,075 |
| Tensile, p.s.i., 30' | 3,475 | 3,375 |
| Elongation, percent 30' | 480 | 430 |
| Aged 2 days at 212° F.—oven: | | |
| 200% modulus, p.s.i., 30' | 2,325 | 2,375 |
| Tensile, p.s.i., 30' | 2,825 | 2,650 |
| Elongation, percent, 30' | 220 | 210 |
| Aged 5 hrs. at 260° F.—Air bomb: | | |
| 300% modulus, p.s.i., 30' | 1,650 | 1,775 |
| Tensile, p.s.i., 30' | 2,600 | 2,675 |
| Elongation, percent 30' | 280 | 270 |

The new stabilizers of the foregoing examples are illustrative. Also the examples are illustrative and the invention is not limited to them. The stabilizer is used in the amount of 0.1 to 5.0 parts per 100 parts of the polymer.

*Treatment of stereo-regular polymers*

Polyisoprene of a given composition is obtained by polymerization in the presence of various catalysts. A preferred catalyst is a lithium-based catalyst. This may be metallic lithium or an organolithium compound in which the lithium exerts a sufficiently strong reducing action to displace hydrogen from water. "Organolithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are, for instance, alkyllithium compounds such as methyllithium, ethyllithium, butyllithium, amyllithium, hexyllithium, 2-ethyhexyllithium and hexadecyllithium. Both branched chain and straight chain alkyl derivatives are included such as n-butyllithium, sec-butyllithium and tert-butyllithium. In addition to the saturated aliphatic lithium compounds, unsaturated compounds are also suitable such as allyllithium, methallyllithium and the like. Aryl-, alkaryl- and aralkyl-lithium compounds such as phenyllithium, the several tolyl- and xylyl-lithiums, alpha- and beta-naphthyllithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, and the like. Tri- and higher lithium hydrocarbons are also suitable, such as 1,3,5-trilithium pentane or 1,3,5-trilithium benzene. Other compounds include the various lithium hydrocarbon amides. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion (the lithium losing an electron to serve as the cation) of the salt.

Other catalysts which can be employed include the Ziegler-type catalysts which are mixtures of organometallic compounds and metals halides. These include alkyl and aryl metal derivatives which may also include halogen; the metals include titanium, zirconium, thorium, uranium, etc. The metal halides includes halides of aluminum, boron, gallium, indium, thallium, etc. Such mixtures of catalysts are known in the art.

Such polymerizations are carried out in the absence of water, and preferably in solution, although solvent is not essential. The amount of Ziegler-type catalyst employed is usually in the range of 0.5 to 50 milli-gram-atoms of total metal in the catalyst per 100 grams of monomer. In the case of a lithium-based catalyst, the amount of catalyst used may be as little as 0.00002 percent, and is usually no more than 0.1 percent, based on the weight of the monomer.

In the case of polyisoprenes prepared by one of the various Ziegler-type catalysts, preferably the catalyst residue is substantially removed or converted to some inert form before addition of the stabilizer of the invention.

If the polymerization is carried out in solution, a non-polar, non-acidic solvent is employed such as hexane, pentane, petroleum ether (or other straight or branched chain saturated aliphatic solvent) or an aromatic solvent such as benzene, toluene or a xylene. The temperatures employed vary from below 0° C. to 100° C., but generally a temperature of 30 to 70° C. is used.

Stereo-regular polyisoprenes produced with such catalysts have the following composition as determined by infra-red analysis:

Cis-1,4-addition product _____ at least 80%.
Trans-1,4-addition product _____ not over 10%.
1,2-addition product _____ essentially none.
3,4-addition product _____ 3 to 10%.

The stabilizer is added to the polymer after polymerization and preferably while the polymer is still in solution, although it may be added at any stage, even by milling after recovery from solution. When added to a solution of the polymer, usually a small amount of the stabilizer in non-aqueous solution or finely divided dispersion in a compatible solvent, for example, benzene, tetrahydrofurane, or heptane or other low-boiling aliphatic solvent is added to a solution of the polymer. The amount of stabilizer used will depend upon the length of time the polymer is to be kept in storage and the conditions of storage, although generally about two parts per 100 parts of the polymer will be satisfactory. As little as one-half part has shown substantial stabilization, and the stabilizer is active at both higher and lower levels, depending upon the degree of protection desired and whether or not other stabilizer is present.

Methods of producing the polymer are well known. The polymerization is carried out with or without solvent. Dry monomer of high purity is employed. The following examples are illustrative:

EXAMPLE 5

One hundred parts by weight of isoprene and 0.15 to 0.5 part of lithium metal dispersed in petrolatum were heated to 50 to 70° C. to initiate the polymerization and then cooled. The reactants were protected from the atmosphere by carrying out the reaction in a closed container. On completion of the polymerization the reaction mixture was cooled before the container was opened. The solid polymerized product was removed from the container and washed on a mill. The stabilizer in suitable amount as a solid, was added during milling.

EXAMPLE 6

One hundred parts by weight of petroleum ether was washed with concentrated sulfuric acid until colorless, and then washed with water and dried. One hundred seventy parts by weight of isoprene and 0.73 part by weight of lithium as a 35 percent dispersion in petrolatum was added. The container was sealed and heated to 50° C. until the polymerization was complete. On completion of the polymerization the stabilizer was added as a solution in a compatible solvent. The entire solvent was removed by evaporation and the resulting stabilized polymer was washed on a mill and then dried in a vacuum oven.

EXAMPLE 7

Catalyst was prepared from:

Diethyl ether _____ ml__ 100
Naphthalene _____ gms__ 12
Lithium dispersion in petrolatum _____ gms__ 2

The above ingredients were agitated together under a blanket of helium for 72 hours at 25° C. The mass was then subjected to distillation under a pressure of 15 to 20 mm. absolute pressure, n-heptane being continuously added to replace the diethyl ether which was lost.

An amout of the resulting dispersion containing 6 ml. of lithium naphthalenide was added to a polymerization vessel together with 225 ml. of petroleum ether, 75 ml. of purified isoprene and 1 ml. of 1-molar solution of titanium tetrachloride. In the resulting lithium composite used as a catalyst, the ratio of Li/TiCl$_4$ is 3.36. The container was flushed with helium and sealed and heated for 18 hours in a water bath at 55° C. while being stirred magnetically. The stabilizer in solution is added to the resulting polymer solution and the polymer recovered in any suitable manner as indicated in the foregoing.

The isoprene polymer of each of the foregoing examples contained at least about 80 parts of cis-1,4-structure, not in excess of 10 percent trans-1,4-structure, essentially no 1,2-structure, and 3 to 10 percent of 3,4-structure. The composition can be varied by using different catalysts. Polymers of this general composition are valuable commercially.

EXAMPLE 8

To one sample of a stereo-regular polymer of isoprene similarly prepared and having the following composition:

| | Percent |
|---|---|
| Cis-1,4-addition product | 88.2 |
| Trans-1,4-addition product | 3.8 |
| 3,4-addition product | 7.9 | there was added 0.2 part of Stabilizer A per 100 parts by weight of the polymer, and to another sample of this polymer there was added 0.2 part of Stabilizer A and 0.2 part of di-t-butyl-p-cresol. Both samples were heated in an air oven for 24 hours at 100° C. with the following results:

| | Light stability | Inherent viscosity |
|---|---|---|
| Sample+Stabilizer A | Fair | 5.35 |
| Sample+Stabilizer A+DBPC* | Good | 4.76 |

*Di-t-butyl-para-cresol.

The gel content of the aged samples was low. The stability recorded indicates that there was little or no decomposition of the polymer. The viscosity shows that only slight decomposition occurred. Although di-t-butyl-para-cresol is a known light stabilizer, Stabilizer A is a fairly good light stabilizer as well as being a heat stabilizer.

The composition of stereo-regular polymers of butadiene also is controlled by the catalyst employed, etc. as is known in the art. Polybutadienes having compositions within the following ranges differ in properties from emulsion-polymerized butadiene and have important commercial value:

Cis-1,4-addition product _____ 23.99%.
1,2-addition product _____ Less than 15%.
Trans-1,4-addition product _____ Balance.

The polymerization is carried out according to any polymerization procedure usual with the stereo-catalysts. For example, the butadiene is washed to remove inhibitor and dried by passing it through an alumina column. A 25-percent solution if this dry butadiene in dry hexane is placed in an autoclave, using care to exclude air and moisture. Then, while stirring, n-butyllithium catalyst is added using 0.0035 part by weight of carbon-bound lithium (Gilman and Haubein, J. Am. Chem. Soc. 66, 1519; 1944) per 100 parts of butadiene. The polymerization is carried out at temperature of 74–110° F. for 24 hours. The stabilizer is added dispersed in a solvent compatible with hexane.

EXAMPLE 9

Two-tenths part by weight of Stabilizer A was added to the polybutadiene having approximately the following composition:

| | Percent |
|---|---|
| Cis-1,4-addition product | 29.4 |
| Trans-1,4-addition product | 62.3 |
| 1,2-addition product | 8.3 |

The stabilized polymer was aged 24 hours in an air oven at 100° C. The polymer was in very good shape after such aging. It had a gel content of only 1.25 percent and an inherent viscosity of 4.45.

EXAMPLE 10

The butadiene polymer was prepared with butyllithium catalyst and its composition as determined by infra-red analysis was within that given above.

Two-tenths part by weight of Stabilizer A was added to 100 parts of the polymer. After 24 hours aging in a forced-draft oven at 100° C., the gel content was only 0.52 percent. The color was good. The control containing no stabilizer turned dark yellow and had an inherent viscosity of 33.5.

The tests, using different stabilizers, and made in different polymers prepared in different systems, show the stabilizers are generally effective for synthetic polymers to which the invention relates. The stabilized polymers can be cured successfully by any and all conventional methods of vulcanizing or cross-linking olefinically unsaturated synthetic rubbers, including vulcanizing with sulfur or sulfur-donating compositions; peroxides, e.g., dicumyl peroxide; phenolic resins, e.g. 2,6-dimethylol-p-cresol; or by exposure of the synthetic rubber to powerful electromagnetic radiation. The synthetic rubbers protected by the invention are homopolymers of conjugated diolefins of 4 to 6 carbon atoms (e.g., butadiene-1,3; isoprene; piperylene; 2,3-dimethylbutadiene-1,3; 2-methylpentadiene-1,3) or copolymers of any of such diolefins in any and all proportions or copolymers of one or more such diolefin with a vinyl monomer copolymerizable therewith.

The stereo-regular synthetic rubbers protected by the invention are homopolymers of any of such diolefin monomers or copolymers in which such diolefin monomers predominate, the portions of the polymers derived from diolefin monomers being of at least 85 percent 1,4-addition microstructure. These stereo-regular polymers are obtainable, as is taught hereinabove, by non-aqueous polymerizations in the presence of a lithium-based catalyst or of a Ziegler-type catalyst. By the use of a catalyst of the latter type containing iodine a polybutadiene of about 90 percent cis-1,4 content can be made. By the use of a Ziegler-type catalyst in which the heavy metal is cobalt a polybutadiene of 90 to 99 percent cis-content can be made. Both latter polymers can be protected by the present invention.

What I claim is:

1. A synthetic rubber of the class consisting of polymers of hydrogen diene monomers of 4 and 5 carbon atoms and copolymers thereof with styrene, substituted styrenes, acrylonitrile, lower alkyl acrylates and methacrylates, and vulcanizates thereof, which rubber is stabilized with a stabilizing amount of an imidazolidine thione of the formula

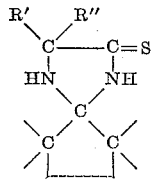

in which R'—C—R" is selected from the group in which (a) R' is an alkyl radical of 1 to 12 carbon atoms with R" hydrogen, (b) R'—C—R" is cyclohexyl and (c) R'—C—R" is alkyl-substituted cyclohexyl in which each alkyl substituent contains 1 to 12 carbon atoms, and

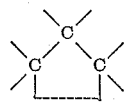

is selected from the group consisting of cyclohexyl and alkyl-substituted cyclohexyl in which each alkyl substituent contains 1 to 12 carbon atoms, which stabilizer inhibits oxidation of the rubber.

2. The composition of claim 1 in which the rubber is a stereo-regular synthetic rubber polymer.

3. The composition of claim 1 in which the rubber is a synthetic stereo-regular polyisoprene with a content of cis-1,4-addition product of at least 80 percent.

4. The composition of claim 1 in which the rubber is a synthetic stereo-regular butadiene polymer.

5. The composition of claim 1 in which the rubber is an emulsion copolymer of butadiene and styrene.

6. The composition of claim 1 in which the imidazolidine thione is 7,4-diazadispiro-[5.1.5.2]-pentadecane-15-thione.

7. The process of treating a synthetic rubber of the class consisting of polymers of hydrocarbon aliphatic diene monomers of 4 and 5 carbon atoms and copolymers thereof with styrene, substituted styrenes, acrylonitrile, lower alkyl acrylates and methacrylates, and vulcanizates thereof, which process comprises mixing therewith a stabilizing amount of an imidazolidine thione of the formula

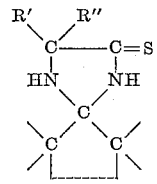

in which R'—C—R" is selected from the group in which (a) R' is an alkyl radical of 1 to 12 carbon atoms with R" hydrogen, (b) R'—C—R" is cyclohexyl and (c) R'—C—R" is alkyl-substituted cyclohexyl in which each alkyl substituent contains 1 to 12 carbon atoms, and

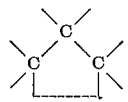

is selected from the group consisting of cyclohexyl and alkyl-substituted cyclohexyl in which each alkyl substituent contains 1 to 12 carbon atoms, which stabilizer inhibits oxidation thereof, and then aging the synthetic rubber.

8. The process of claim 7 in which the rubber is a stereo-regular polymer of isoprene which by infra-red analysis has the following composition:

| | |
|---|---|
| Cis-1,4-addition product | At least 80%. |
| Trans-1,4-addition product | Not over 10%. |
| 3,4-addition product | At least 3%. |
| 1,2-addition product | Essentially none. |

9. The process of claim 7 in which the rubber is a stereo-regular polymer of butadiene which by infra-red analysis has the following composition:

| | |
|---|---|
| Cis-1,4-addition product | 23–99%. |
| 1,2-addition product | Less than 15%. |
| Trans-1,4-addition product | Balance. |

10. The process of claim 7 in which the rubber is an emulsion copolymer of butadiene and styrene.

11. The process of claim 7 in which the stabilizer is 7,4-diazadispiro-[5.1.5.2]-pentadecane-15-thione.

12. The composition of claim 1 in which the rubber is vulcanized copolymer of butadiene and styrene.

13. The process of vulcanizing a rubber copolymer of butadiene and styrene with sulfur which comprises subjecting the same to vulcanizing conditions in the presence of a stabilizing amount of an imidazolidine thione of the formula

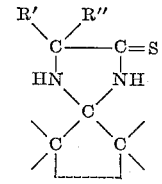

in which R'—C—R" is selected from the group in which (a) R' is an alkyl radical of 1 to 12 carbon atoms with R" hydrogen, (b) R'—C—R" is cyclohexyl and (c) R'—C—R" is alkyl-substituted cyclohexyl in which each alkyl substituent contains 1 to 12 carbon atoms, and

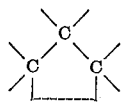

is selected from the group consisting of cyclohexyl and alkyl-substituted cyclohexyl in which each alkyl substituent contains 1 to 12 carbon atoms.

References Cited by the Examiner

UNITED STATES PATENTS

| 2,785,175 | 3/57 | Christian | 260—309.7 |
| 2,806,036 | 9/57 | Christian | 260—309.7 |
| 2,842,553 | 7/58 | Christian | 260—309.7 |

OTHER REFERENCES

Bucherer et al.: J. Prakt. Chem., volume 14, pages 147–50 (1934).

LEON J. BERCOVITZ, *Primary Examiner.*

ALPHONSO D. SULLIVAN, *Examiner.*